E. P. McCARTHY.

Wagon-Springs.

No. 5,615. Reissued Oct. 21, 1873.

Witnesses
John L. Boone
C. W. Richardson

Edmund P. McCarthy
Per Dewey & Co
Attys

UNITED STATES PATENT OFFICE.

EDMOND P. McCARTHY, OF SAN FRANCISCO, CALIFORNIA, ASSIGNOR TO HIMSELF AND JOHN GRANT, OF SAME PLACE.

IMPROVEMENT IN WAGON-SPRINGS.

Specification forming part of Letters Patent No. 90,861, dated June 1, 1869; reissue No. 5,615, dated October 21, 1873; application filed September 13, 1873.

*To all whom it may concern:*

Be it known that I, EDMOND P. McCARTHY, of city and county of San Francisco and State of California, have invented certain new and useful Improvements in Wagon and other Springs; and I do hereby declare that the following is a full, clear, and exact description thereof, that will enable others skilled in the art to which it appertains to make and use the same, reference being had to the accompanying drawings and to the letters of reference marked thereon, which form a part of this specification.

My invention relates to certain improvements in the construction of an elastic cushion to be employed in connection with the springs of carriages and vehicles, and also upon all classes of railway-carriages, so that, by the peculiar shape of this cushion, its elasticity will be the greatest when the weight first begins to compress it, or whenever it carries a light load, and its tension or resisting force will increase directly as the weight or compression increases. My invention further consists in the employment of a peculiarly-constructed bolt, which is to be used with my cushion, as will be hereafter more fully explained.

Figure 1:
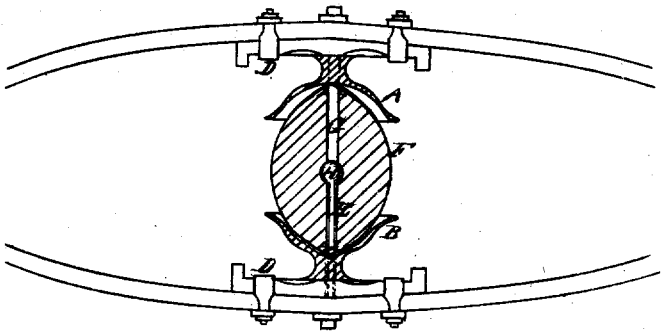
Figure 2:
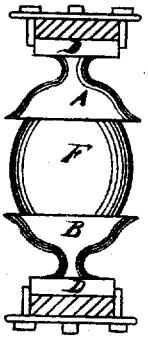
Figure 3:
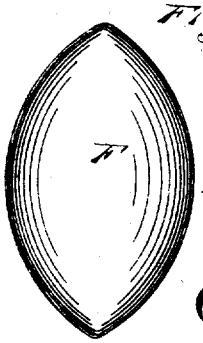

Referring to the accompanying drawings for a more complete explanation of my invention, Figure 1 is a vertical transverse section of the holding-cups and a part of my cushion. Fig. 2 is a side view of the whole with a section of a carriage-spring, between which it is placed.

A and B are the upper and lower cups, within and between which the cushion is placed. These cups are provided with base plates or flanges D D, by which to secure them, and do not differ materially from the cups employed by me in my spring, for which Letters Patent No. 67,782 were granted to me August 13, 1867. Between the cups the cushion F is placed. This cushion is made conical or elliptical in form, with its longest diameter standing vertically, partly to enable the cushion to receive the weight before the spring has been forced down any considerable distance, but principally for the purpose of graduating and regulating its elasticity to the load which it must carry.

It will be manifest that the small diameter of the cushion at its extreme ends will cause it to be much more elastic and offer less resistance; or, in other words, the spring will not be as stiff when it carries a light load as it would if in the form of a cylinder; but when the cushion is compressed by a heavy load it will have all the tension and resistance due to its increased central diameter. This construction makes my spring self-adjustable to its load, and greatly increases its usefulness.

In order to support my cushion or spring, and hold it firmly on the cup, a vertical hole is made through the cushion, and the bolt E is drawn into it. This bolt is provided with a double conical or round head, H, which is considerably larger than the hole, and this enlargement H is drawn from one-half to two-thirds of the distance through the cushion by turning the nut at the bottom of the bolt E. The shape of this head H is such that it forms a double countersink above and below it in the cushion, and holds it in its position in the cup when the cushion is pressed down with weight, as well as when relieved from it. By this means the cushion will also be prevented from turning to either side of the spring, or doubling over when it receives the weight of the load, and the upper cup bears down upon the top of it.

Both ends of the upper and lower cup-plates are secured to the elliptic spring by clips, thus firmly binding the leaves together, and largely relieving the inner leaves from vibration, so incident to elliptic steel springs, and especially in passing over rough places.

Having thus described my invention, what I claim, and desire to secure by Letters Patent, is—

1. The elastic elliptical spring F, constructed substantially as and for the purposes herein described.

2. The bolt E, having the enlargement H, in combination with the spring F, substantially as and for the purpose set forth.

In witness whereof I hereunto set my hand and seal.

E. P. McCARTHY. [L. S.]

Witnesses:
JOHN HAMILL,
C. MILTON RICHARDSON.